UNITED STATES PATENT OFFICE.

JONATHAN W. HARRIS, OF MONTCLAIR, NEW JERSEY, ASSIGNOR, BY MESNE ASSIGNMENTS, TO WESTERN ELECTRIC COMPANY, INCORPORATED, A CORPORATION OF NEW YORK.

INSULATING COMPOUND AND THE METHOD OF FORMING THE SAME.

1,240,565. Specification of Letters Patent. Patented Sept. 18, 1917.

No Drawing. Application filed March 5, 1915. Serial No. 12,392.

*To all whom it may concern:*

Be it known that I, JONATHAN W. HARRIS, a citizen of the United States, residing at Montclair, in the county of Essex and State of New Jersey, have invented certain new and useful Improvements in Insulating Compounds and the Methods of Forming the Same, of which the following is a full, clear, concise, and exact description.

This invention relates to an insulating compound and the method of forming the same. Its object is to provide for wires or other electric conductors, an elastic coating possessing high insulating properties and which offers high resistance to solvents, acids, alkalis and heat.

The invention utilizes the desirable property of certain oils, particularly castor oil, of solidifying into an insoluble mass when subjected to destructive distillation, as set forth in United States Letters Patent No. 1,101,281, dated June 23, 1914.

In accordance with the present invention, one or more of the resins, such as the so-called fossil resin, copal, amber, etc., or such resin or resins together with other suitable substances, are brought into combination with a suitable oil, such a castor oil, thereby producing a compound which, when subjected to destructive distillation, that is to temperature such as will result in the polymerization of the oil, will provide an insulating material having the aforementioned desirable properties.

In the preferred manner of practising the invention, castor oil and one or more of the fossil resins, preferably the copals, for example, the so-called "Congo copal", are brought into combination by heating a mixture of the oil and resin or resins until the mixture is brought to quiet fusion. The temperature during this preliminary step of the process is preferably between 250° and 310° C. As is well known, castor oil when subjected to destructive distillation solidifies into an insoluble mass. The aforementioned heating is preferably continued to almost the critical point at which such solidification of the castor oil takes place. In practice, it has been found desirable that the heating of the mixture may be continued until the water, œnanthaldehyde and other decomposition products of castor oil have been distilled to the extent of approximately 5% to 15% of the original volume of castor oil. A fusion mixture is thus produced which, while hot, is readily soluble in such suitable solvents as turpentine, pine oil, solvent naphtha and kerosene, or mixtures of the same. The fusion mixture can quickly and readily be converted, at a suitable temperature, into the insoluble solid condition aforementioned.

The above mentioned fusion mixture may be applied in the melted condition to the wire or other object to be coated or the fusion mixture may be dissolved in a suitable solvent, such as one or more of the solvents above mentioned, and the solution applied to the wire or other object to be coated.

The coated wire or other object is then subjected for a sufficient length of time to a temperature suitable for completing the destructive distillation and polymerization of the castor oil, preferably about 300° C. or thereabout in order to expedite the process. At such temperature the complete destructive distillation and polymerization of the coating upon the wire into a solid mass takes place in from about one-half to three minutes, depending on the size of the wire. A machine especially suitable for applying and baking the insulating coating upon wire is disclosed in United States Letters Patent No. 1,004,251, dated September 26, 1911.

The finished coating is a hard, elastic, continuous enamel-like substance remarkably resistant to heat, organic solvents, dilute acids and alkalis.

Instead of fusing the resins with the castor oil as above described, the resin or resins may be fused separately and then added to the castor oil to form the coating mixture which as before stated is preferably brought as near as possible to the point of solidification before being applied to the wire or other object to be coated.

It has been found that metallic soaps, or metallic oxids suitable, when heated with the oil, for forming metallic soaps (for example, copper oxid, ferric oxid, aluminum oxid and the various oxids of the alkaline earths), or the so-called metallic resinates, or combinations of the aforementioned agents may be substituted, in whole or in part, for the fossil resins in the process and product above described. Processes and products based on these other agents form the subject-matter of other copending applications.

The proportion of castor oil and resin or other of the aforementioned agents may be varied at will, according to the hardness desired in the finished coating. The greater the proportion of resin or other hardening agent or agents, the harder will be the finished coating and the lower its elasticity.

What is claimed is:

1. An insulating coating comprising resin and castor oil subjected to destructive distillation.

2. The process of making an insulating coating mixture which consists in fusing together resin and castor oil at a temperature approximately 250° to 310° C.

3. The process of making an insulating coating mixture which consists in mixing at a temperature approximately 250° to 310° C., a fossil resin and castor oil.

4. The process of making an insulating coating which consists in mixing, by the aid of heat, fossil resin and castor oil, thus forming a coating mixture, and subjecting the coating mixture thus formed, after application to the article to be coated, to a temperature sufficient to destructively distil the castor oil and form a hard, elastic, enamel-like substance.

5. The process of making insulating material which consists in heating a mixture of fossil resin and castor oil, and subjecting said mixture, in the form in which the insulating material is desired, to sufficient heat to convert the mixture into a solid insoluble substance.

6. The process of making an insulating coating which consists in heating a mixture of fossil resin and castor oil to an extent, approximately but short of that necessary for converting the mixture into a solid mass, and then subjecting the mixture applied to an object to be coated, to a temperature suitable for converting the coating into a hard enamel-like substance.

7. The process of making an insulating coating which consists in heating a mixture of resin and castor oil at a temperature approximately 250° to 310° C. until approximately from 5% to 15% of the decomposition products of the castor oil has been distilled and then subjecting the mixture applied to the object to be coated to a temperature of approximately 300° C.

In witness whereof, I hereunto subscribe my name this 3rd day of March A. D., 1915.

JONATHAN W. HARRIS.

Witnesses:
E. EDLER,
K. L. STAHL.